Figure 1:
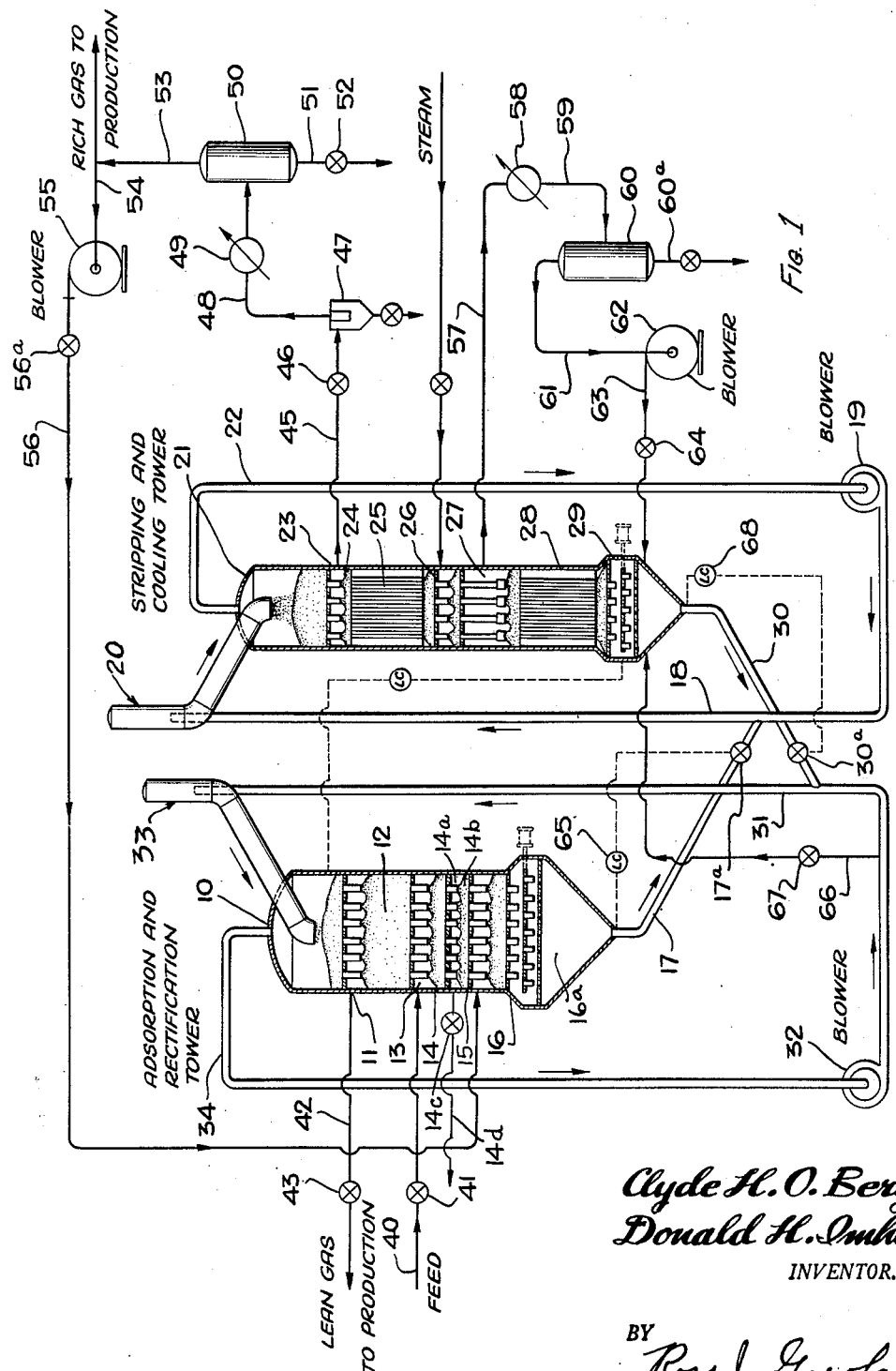

March 13, 1951

C. H. O. BERG ET AL 2,545,067

ADSORPTION PROCESS

Filed Dec. 20, 1946

2 Sheets-Sheet 1

Clyde H. O. Berg
Donald H. Imhoff
INVENTOR.

BY Ross J. Garofalo
ATTORNEY

March 13, 1951 — C. H. O. BERG ET AL — 2,545,067
ADSORPTION PROCESS
Filed Dec. 20, 1946 — 2 Sheets-Sheet 2

INVENTORS.
CLYDE H.O. BERG.
DONALD H. IMHOFF.
BY Ross J. Garofalo
ATTORNEY.

Patented Mar. 13, 1951

2,545,067

UNITED STATES PATENT OFFICE 2,545,067

ADSORPTION PROCESS

Clyde H. O. Berg and Donald H. Imhoff, Long Beach, Calif., assignors to Union Oil Company of California, Los Angeles, Calif., a corporation of California Application December 20, 1946, Serial No. 717,358

23 Claims. (Cl. 183—4.2)

This invention relates to the separation of normally gaseous mixtures by selective adsorption of certain of the constituents of such mixtures on granular solid adsorbents and applies particularly to the separation of those gaseous mixtures containing relatively small amounts of more readily adsorbable constituents by selective adsorption on granular charcoal.

The separation of a gaseous mixture into its constituent components may be accomplished by liquefaction of the mixture followed by fractional distillation, solvent extraction and similar processes. In separating gaseous mixtures containing constituents which possess low critical temperatures, such as ethane, ethylene, methane, etc., the difficulties encountered in liquefaction sometimes render such processes economically impracticable. For example, a fractionator producing an overhead product consisting of substantially pure ethane operates at a pressure of 385 pounds per square inch and employs a reflux temperature of 20° F. A similar fractionator producing substantially pure ethylene as an overhead product operates at 385 pounds per square inch and employs a reflux temperature of —5° F. Production of pure methane by fractional distillation requires a fractionator operating at pressures between 500 and 600 pounds per square inch and employing reflux temperatures approximating —150° F. Utilization of fractionation processes to purify gases with critical temperatures as low as those for the hydrocarbons just cited require excessive pressures and low temperatures to effect liquefaction of the gaseous mixture. Such fractionation operations are therefore quite expensive because of high compression and refrigeration requirements.

We have previously proposed a method whereby gaseous mixtures containing components with critical temperatures as low as those cited above may be conveniently and economically separated at nominal temperatures and pressures which involves the application of selective adsorption operations.

In general the previously proposed process of separating gaseous mixtures by selective adsorption on a granular solid adsorbent involves the steps of countercurrently contacting the gaseous mixture with a moving bed of the adsorbent, thereby adsorbing from the mixture those constituents which are more readily adsorbable and leaving as a substantially unadsorbed gas those constituents which are less readily adsorbable. In a moving bed operation the adsorbent upon which certain of the gaseous constituents have been adsorbed flows from an adsorption zone into a stripping or desorption zone wherein the adsorbent is heated and contacted with a stripping gas, such as steam for example, to cause the adsorbed constituents to be liberated. The adsorbent, freed of adsorbed constituents, is subsequently cooled prior to repassage through the adsorption zone. In this proposed process of selective adsorption a gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption zone of the less readily adsorbable constituents as a substantially unadsorbed gas.

In a recently proposed improvement in the art of separation of gaseous mixtures by selective adsorption an adsorption column has been provided which contains two or more rectification sections which permits the separation of the gaseous mixtures into more than two fractions. Such operations are made possible by the utilization of a refluxing step within these rectification sections permitting production not only of the lean and rich gases, cited above, but also one or more intermediate fractions containing constituents which are of intermediate adsorbability.

In the design of selective adsorption equipment the diameter of the adsorption column depends largely upon two factors: First, the amount of the gaseous mixture to be handled per unit time, and secondly, the concentration in the gaseous mixture of those constituents of low critical temperature which are not readily adsorbable and which pass substantially unadsorbed through the column. It will be obvious to those skilled in the art that in separating gaseous mixtures containing approximately equal proportions of the more readily and less readily adsorbable constituents the cross sectional areas required in the adsorption section and the desorption or stripping section will be approximately the same because the amount of gas passing unadsorbed through the adsorption section will be nearly the same as the amount of gas removed from the charcoal in the desorption or stripping section. Adequate cross sectional areas must be provided at all parts of the selective adsorption system in order to limit gas velocities to values which are low enough to prohibit any lifting effect on the adsorbent and which will result in nominal pressure drops between the gas inlet and outlet of the system. Gaseous mixtures which contain greater than about 30% by volume of constituents which are readily adsorbable may be conveniently separated by the processes previously proposed. Gaseous mixtures which contain less than about 20% by volume of the more readily adsorbable constituents and contain, therefore, large amounts of constituents which are not readily adsorbable require adsorption section cross sectional areas which are considerably larger than the areas required in the desorption or stripping section.

Such gaseous mixtures containing relatively small amounts of the more readily adsorbable constituents occur frequently in industrial practice. This type of gaseous mixture may be exemplified by the recovery of vaporized solvents from air, the recovery of natural gasoline from the natural gas produced simultaneously with crude petroleum, the recovery of carbon dioxide from flue gases, the recovery of sulfur dioxide and sulfur trioxide from sulfur burner flue gases, the recovery of the equilibrium mixture nitrogen tetroxide - nitrogen dioxide occurring in the effluent gases from catalytic air oxidation of ammonia, the separation of light hydrocarbon gases, such as, methane, or the separation of oxygen, nitrogen, carbon monoxide, carbon dioxide and water vapor contaminants from hydrogen, and many other gaseous mixtures. Our process is equally effective in the recovery of either the major or minor constituent of such gaseous mixtures or both provided that the more readily adsorbable constituent is in the minor proportion, for example, less than about 30 volume per cent. It is particularly well adapted to the separation of gaseous mixtures wherein the more readily adsorbable constituent is present in concentrations less than 15 volume per cent.

The separation of these types of gaseous mixtures by selective adsorption requires apparatus having a large cross sectional area in the adsorption section because of the large quantities of gases passing therethrough, whereas, the required diameters of the desorption or stripping section may in most cases be much smaller depending upon the concentrations in the gaseous mixture of the more readily adsorbable constituents.

It is, therefore, an object of the present invention to provide an improved and more economical selective adsorption process.

It is a more particular object to provide an improved selective adsorption process for the separation of gaseous mixtures in which the more readily adsorbable constituents are present in relatively small amounts.

Another object of our invention is to provide an improved process of selective adsorption by which such gaseous mixtures may be separated more economically and with higher recoveries than previously possible.

It is still a further object to provide an improved apparatus which is particularly adapted to the separation of gaseous mixtures containing small amounts of more readily adsorbable constituents.

According to the process of our invention we are able to accomplish the above contemplated objects by providing in the improved selective adsorption process, as more fully described hereinafter, two separate columns or towers which may be of differing diameters. When such gaseous mixtures are to be separated, the adsorption section, which must be provided with a large cross sectional area, may be isolated in a low tower of larger diameter and the desorption or stripping section which will require a smaller cross sectional area may be isolated in a low tower with the smaller diameter. One particular advantage of our invention is that the tower containing the desorption or stripping section may be of the minimum required diameter and not over designed to the same diameter as that required by the adsorption section. Thus, we provide two low towers one of small diameter instead of one tall tower of large diameter, resulting in reduced construction costs and more efficient operation.

In one variation of the improved selective adsorption process of the present invention the adsorbent cooling and desorption sections are included in the smaller diameter tower while the adsorption section and any rectification sections are included in the larger diameter tower.

In this process the gaseous mixture to be separated is introduced into the central portion of the adsorption tower where it is contacted countercurrently with a moving bed of granular adsorbent. During the passage of the gaseous mixture upward through the tower the more readily adsorbable constituents together with a smaller portion of the less readily adsorbable constituents are adsorbed on the adsorbent to form an enriched adsorbent. From the upper portion of the adsorption tower the less readily adsorbable constituents are removed as substantially unadsorbed lean gas. The enriched adsorbent flows downwardly by gravity through at least one rectification zone into which is introduced a reflux stream of more readily adsorbable constituents for the purpose of insuring desorption of the small amount of less readily adsorbable constituents from the adsorbent. In such cases wherein the gaseous mixtures to be separated contain normally liquid constituents, such as for example natural gasoline in natural gas or volatile organic solvents in air or other light gas, the use of rectification is in general not warranted because of the fact that the normally liquid constituents are more readily adsorbable by the adsorbent to such an extent that they virtually cause the complete exclusion from the adsorbent of the less readily adsorbable constituents. The enriched adsorbent leaving the bottom of the adsorption tower is substantially saturated with the more readily adsorbable constituents and is introduced into the top of the desorption or stripping tower. This one modification of the desorption tower contains in descending sequence the desorption section, a sealing leg section and a cooling section. The enriched adsorbent containing adsorbed constituents moves downwardly through the desorption section where it is heated and contacted counter-currently with a stripping gas, such as for example, steam. The adsorbed constituents are thereby desorbed from the adsorbent to form a lean adsorbent and the thus desorbed constituents are removed from the system with the stripping gas. The hot lean adsorbent flows downward through the sealing leg section into the cooling section in which the adsorbent is cooled sufficiently for efficient adsorption prior to repassage through the adsorption section. The adsorbent thus cooled is removed from the bottom of the cooling section and is introduced into the top of the adsorption tower.

The preferred means utilized in the conveyance of the adsorbent from the lower portion of one tower to the upper portion of the other comprises a pair of gas lifts whereby a suspension of the adsorbent in a gas is transferred from the bottom of one tower to the top of the other, although the conventional bucket elevator and other means are applicable.

In the following description of our invention, the process will be described for purposes of greater clarity as employing charcoal as the adsorbent and utilizing as a feed a specific gaseous mixture of the lower molecular weight hydrocarbons. In the case of a gaseous mixture flowing at a rate of 10,000 MSCF/D (10,000,000 standard cubic feet per day) and having the following composition:

| Component | Volume Per Cent | Rate MSCF/D |
| --- | --- | --- |
| $C_1$ hydrocarbon (methane) | 95.0 | 9,500 |
| $C_2$ hydrocarbon | 3.0 | 300 |
| $C_3$ hydrocarbon | 2.0 | 200 |
| | 100.0 | 10,000 | the separation is conducted at a pressure of 100 pounds per square inch gauge and employing a charcoal circulation rate of 42,000 pounds per hour.

Because of the large amount of methane in the feed gas which is substantially unadsorbed on the charcoal at 100 pounds per square inch pressure, the diameter of the adsorption tower is required to be 9′ 0″ to provide sufficient cross sectional area for methane throughput. The diameter of the stripping tower is 5′ 6″ which is ample to provide space for heating and cooling the charcoal and desorption of adsorbed gas.

The method and apparatus of the present invention permits the production of 9,519 MSCF/D of a lean gas consisting of 99.6% by volume of methane and 480 MSCF/D of a rich gas fraction containing $C_2$ and $C_3$ hydrocarbons, and including less than 4% by volume of methane. The recovery of methane effected in the lean gas stream amounts to 99.8% by volume based on the methane present in the feed gas.

Figure 3:
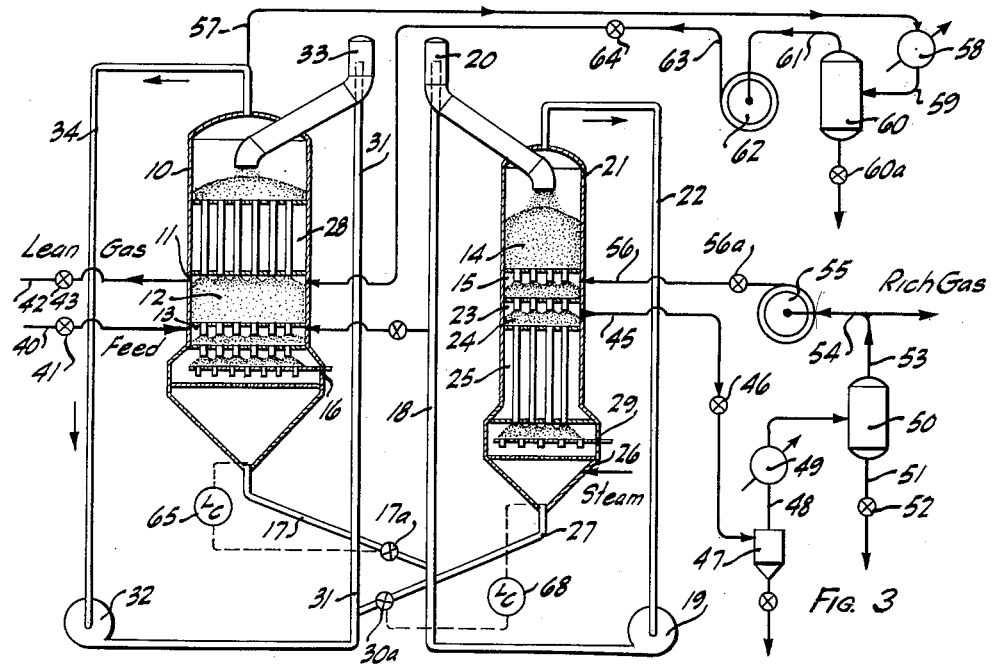
Figure 2:
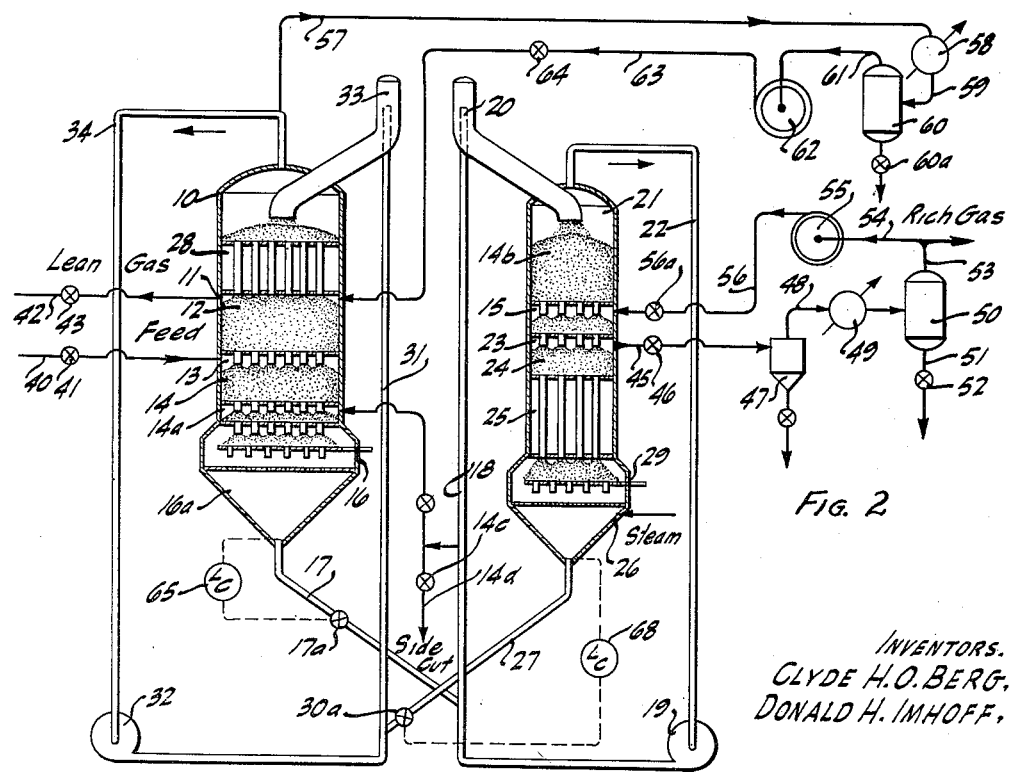

The invention is illustrated in the attached drawings Figures 1, 2 and 3, in which Figure 1 shows one modification in which the cooler is in the stripping tower, and Figures 2 and 3 show modifications in which the cooler is in the adsorption tower. In the Figure 2 modification only the primary rectification section is left in the adsorption tower, and in the Figure 3 modification neither the primary nor the secondary rectification section is in the adsorption tower.

Referring more particularly to the drawing, Figure 1, which represents a general flow diagram of arrangement of apparatus adapted to carry out the process, charcoal is introduced into the upper portion of the adsorption and rectification tower 10 and flows successively by gravity through lean gas disengaging section 11, adsorption section 12, feed gas engaging section 13, rectification section 14 (see description of 14a, b, c and d infra), reflux engaging section 15, charcoal feeder 16 which governs the rate of charcoal flow through the adsorption tower into the bottom section 16a from which it is withdrawn through transfer and sealing leg line 17 controlled by valve 17a. The charcoal is then introduced into lift line 18 forming a gas-charcoal suspension with the gas flowing upward therein. Gas circulation through lift line 18 is maintained by blower 19 serving to lift the charcoal into impactless separator 20 located above stripping and cooling tower 21. The gas-charcoal suspension is broken in impactless separator 20 and the charcoal is conducted with the lift gas into the top of tower 21. A return line 22 is provided for the lift gas which is recirculated through the lift line 18 by means of blower 19.

The charcoal introduced into the upper portion of tower 21 flows successively by gravity through rich gas disengaging section 23, steaming section 24, desorption section 25, steam engaging section 26, sealing leg section 27, cooling section 28, charcoal feeder 29, transfer and sealing leg line 30, controlled by valve 30a and is introduced into lift line 31, again forming a gas-charcoal suspension. Gas circulation through lift line 31 is maintained by means of blower 32 serving to lift the charcoal into impactless separator 33 located above tower 10. The gas-charcoal suspension is again broken and the charcoal flows into the top of tower 10 with the lift gas. A return line 34 is provided to return the lift gas to blower 32 for recirculation.

The feed gas, consisting largely of methane contaminated with small quantities of $C_2$ and $C_3$ hydrocarbons, is introduced by means of line 40 controlled by valve 41 through feed gas engaging section 13 into adsorption section 12 where it is contacted by a moving bed of granular charcoal. The feed gas rises through adsorption section 12 countercurrent to the descending flow of charcoal which adsorbs the $C_2$ and $C_3$ hydrocarbon components in the feed gas together with small quantities of methane. A portion of the methane, which is about 99.6% pure, flows upward through lean gas disengaging section 11 into the free space at the top of tower 10, is circulated through line 34 and is used as lift gas while the remainder is removed from tower 10 through lean gas disengaging section 11 by means of line 42 controlled by valve 43 as the pure methane product. The enriched charcoal containing the adsorbed $C_2$ and $C_3$ hydrocarbon constituents together with small quantities of methane flows downward through feed gas engaging section 13 into rectification section 14 where it is contacted by a reflux stream of $C_2$ and $C_3$ hydrocarbon constituents introduced below rectification section 14 at reflux engaging section 15. This reflux is preferentially adsorbed on the charcoal serving to desorb any methane present and the methane flows upward through feed gas engaging section 13. The enriched and rectified charcoal, saturated with $C_2$ and $C_3$ hydrocarbons, flows downward through charcoal feeder 16, into the bottom section 16a from which it is withdrawn through transfer and sealing leg line 17 controlled by valve 17a and is thus removed from the bottom of the tower 10. The thus removed charcoal is introduced into lift line 18 and is conveyed into tower 21 in the manner previously described.

The enriched charcoal containing the adsorbed $C_2$ and $C_3$ hydrocarbons flows through rich gas disengaging section 23 into steaming section 24 where it is contacted by a stripping gas, such as for example, steam, which serves to liberate substantially all of the hydrocarbons adsorbed on the charcoal to form a rich gas. A portion of the rich gas flows upward through rich gas disengaging section 23, through line 22 and is employed as lift gas in lift line 18. The remainder of the rich gas, consisting of $C_2$ and $C_3$ hydrocarbons together with the stripping steam, is removed from the system through rich gas disengaging section 23 by means of line 45 controlled by valve 46 through dust separator 47 which removes traces of charcoal dust from the rich gas. The rich gas is conducted by means of line 48 to surface condenser 49 which cools the rich gas and condenses the steam. The cooled mixture is passed to separator drum 50 where the steam condensate is removed by means of line 51 controlled by valve 52 and is returned to the steam source while the rich gas is removed by means of line 53. A portion of the rich gas is sent to production while the remainder is returned by means of line 54, blower 55 and line 56 controlled by valve 56a as reflux in rectification section 14.

The charcoal flows downward through desorption section 25 where it is heated and contacted by a countercurrent stream of steam in order to remove last traces of adsorbed hydrocarbons. The stripped charcoal flows through steam engaging section 26 into sealing leg section 27.

Sealing leg section 27 is situated below stripping section 25 and above cooling section 28 and serves to prevent contamination of the rich $C_2$ and $C_3$ hydrocarbon gas stream removed from desorption section 25 with methane present in cooling section 28. Sealing leg section 27 comprises a series of parallel tubes 4' 0" long extending downward from a tray similar to that used in engaging and disengaging sections. The tube diameter is small, with just sufficient total area to handle the 42,000 pounds per hour of charcoal passing through tower 21. A portion of the steam, introduced at steam engaging section 26 which normally is the point of highest pressure in the system, flows downward through the tubes of sealing leg section 27 concurrently with the charcoal. The steam flowing through sealing leg section 27 causes a pressure drop between the steam inlet point and the top of cooling section 28 in such a direction as to make impossible any gas flow upward from the cooling section into the stripping section. The steam flowing downward through sealing section 27 is removed together with methane flowing upward through cooling section 28 by means of line 57 and is conveyed to surface condenser 58 wherein the steam is condensed. The condensate and cooled gas are conducted by means of line 59 to separator drum 60 from which the gas is returned by means of line 61, blower 62, line 63 controlled by valve 64 to the free space below charcoal feeder 29 and passes again up through the cooler to sealing leg section 27 repeating the cycle. The condensate is withdrawn from the bottom of the drum via line 60a.

The stripped charcoal flows through tubular cooling section 28 and is cooled to a temperature suitable for repassage through tower 10. It passes through charcoal feeder 29, through transfer line 30 and is introduced by means of lift line 31 and impactless separator 33 into adsorption and rectification tower 10 in the manner previously described.

A gas flow exists through transfer and sealing leg line 17 which is maintained full of charcoal by means of level control 65 and charcoal valve 17a. This gas flow is concurrent with the downward-flowing charcoal and comprises part of the rich gas reflux introduced into the tower by means of engaging section 15. The gas flows into the lift line 18 and is returned to the top of tower 21 with the lift gas and charcoal. Actually the amount of this flow is small, sufficient reflux only being required to cause desorption of any methane present on the charcoal flowing downward from adsorption section 12 and maintain the charcoal flowing through charcoal feeder 16 in a condition of saturation with respect to those components present in the reflux. Any excess over this amount flows downward through line 17.

The charcoal flowing through tubular cooling section 28 becomes saturated with the lean gas circulated upward through the cooler by means of blower 62. In order to make up this loss, line 66 controlled by valve 67 is provided which introduces lean gas from the lift blower 32 into the portion of tower 21 just below charcoal feeder 29. To avoid by-passing this gas through transfer line 30, the latter is maintained full of charcoal by means of level control 68 controlling charcoal valve 30a.

The charcoal circulation rate employed for a given separation is controlled by accurate co-functioning of the charcoal feeders 16 and 29 in tower 10 and tower 21, respectively. Several methods exist for their operation and will readily occur to those skilled in the art. However, one way in which the circulation rate may be controlled is as follows: Feeder 16 is controlled by a timing mechanism to deliver the required amount of charcoal per hour into lift line 18. Feeder 29 is controlled by the charcoal level in the top of tower 10 and in this manner the proper depth of charcoal exists in the adsorption tower. Location of electrical conduction-type high and low level alarms (not shown) in the free space at the top of tower 21 above disengaging section 23 serve to indicate the charcoal level at this point and charcoal may be removed or added until smooth operation is effected.

In a feed gas similar to the one used in the above description further fractionation of the rich gas to produce substantially pure $C_2$ and $C_3$ hydrocarbon streams may be obtained by the inclusion of a second rectification zone 14b. Such a rectification zone would be situated above the reflux engaging section and provided with a side cut disengaging section 14a. The enriched charcoal would flow through the feed gas engaging section into the first rectification section. Here any adsorbed methane would be desorbed by contacting the charcoal with a stream of $C_2$ hydrocarbons which would be desorbed from the charcoal in the second rectification section by contacting the charcoal with a reflux of $C_3$ hydrocarbons. The rich gas under these conditions of operation would consist substantially of $C_3$ hydrocarbons, while the side cut removed from a disengaging section 14a through line 14d controlled by valve 14c would comprise the $C_2$ hydrocarbons and minor amounts of methane and $C_3$ contaminants. A higher degree of fractionation may be obtained with more complex gaseous mixtures by inclusion of a multiplicity of rectification zones for producing a plurality of streams with differing compositions. The operation of such a system is obvious from the foregoing description.

In another modification of the present invention, as shown in Figure 2, the cooling section is disposed above the adsorption section in the adsorption tower and the rectification section is placed above the desorption section in the desorption tower. A further modification is shown in Figure 3 in which two rectification sections are used as described above so as to obtain a side cut or intermediate fraction, and one rectification section is placed in each tower. Thus the adsorption tower contains the cooling, adsorption, and primary rectification sections and the desorption tower contains the secondary rectification and desorption sections. The same numbers are used to designate corresponding parts on all three figures, so that the operation of each modification will be clear from the preceding description.

It is to be understood, however, that this specific separation is used here only for purposes of description and that our invention is applicable with advantage to any gaseous mixture in which the higher molecular weight, more readily adsorbable constituents are present in relatively small concentrations, that is to say, less than about 30 volume per cent.

For application to the continuous selective adsorption process as herein described, we prefer activated granular charcoal with granules ranging from 10 to 14 mesh in size. However, we do not wish to be limited thereby, because in certain specific applications granules as large as about 2 mesh are applicable and in some cases powdered charcoals as fine as about 500 mesh may be used.

A modification also exists in the manner in which the granular adsorbent is conveyed from the bottom of one tower to the top of the other. Elevator means may be applied to move the adsorbent, but in view of the difficulties of maintenance and operation at elevated pressures, the use of the gas lift system shown in the example is to be preferred.

It is to be understood that the present invention resides primarily in an improved selective adsorption process wherein gaseous mixtures containing relatively small amounts of the higher molecular weight constituents, for example, from traces of these components to about 30 volume per cent, may be efficiently and conveniently separated without the disadvantages inherent in conventional separation processes. Thus, any modification may be made in the particular method in which the adsorption, pretreatment, or subsequent treatment is carried out without departing from the basic invention herein disclosed.

Having described and illustrated our invention and realizing that many modifications thereof may occur to those skilled in the art without departing from the spirit or scope of our invention, we claim:

1. A continuous process for separating a gaseous mixture containing constituents of varying degrees of adsorbability which comprises flowing a moving bed of granular solid adsorbent downwardly by gravity through an adsorption zone, introducing said gaseous mixture into said adsorption zone, adsorbing therein the more readily adsorbable constituents of said mixture on said adsorbent to form a rich adsorbent, flowing said rich adsorbent from said adsorption zone into a rectification zone, introducing into said rectification zone a reflux comprising a rich gas containing the more readily adsorbable constituents of said mixture, withdrawing said rich adsorbent from said rectification zone, suspending the withdrawn adsorbent in a rich lift gas and conveying as a gaseous suspension thereby said rich adsorbent from said rectification zone to a desorption zone, heating said rich adsorbent and desorbing the adsorbed constituents therefrom in the presence of a countercurrent flow of stripping gas to form a lean adsorbent, withdrawing the desorbed constituents from said desorption zone as a rich gas, introducing a portion of said rich gas as reflux into said rectification zone, flowing said lean adsorbent from said desorption zone into a cooling zone, cooling said lean adsorbent therein while passing therethrough a portion of a lean gas, withdrawing the cooled lean adsorbent from said cooling zone, withdrawing from said adsorption zone said lean gas comprising the less readily adsorbable constituents, introducing a portion thereof into said cooling zone, suspending said cooled lean adsorbent in a lean lift gas and conveying as a gaseous suspension thereby said cooled lean adsorbent from said cooling zone to said adsorption zone.

2. A process according to claim 1 in which the adsorbent from the rectification zone is allowed to flow through a secondary rectification zone prior to being conveyed to the desorption zone, the rich gas reflux is introduced into the lower portion of the secondary rectification zone, and a side cut gas is removed from the upper portion of the secondary rectification zone.

3. A continuous process according to claim 1 wherein said granular solid adsorbent comprises charcoal.

4. A continuous process for separating a gaseous mixture containing constituents of varying degrees of adsorbability which comprises flowing a moving bed of granular solid adsorbent downwardly by gravity through an adsorption zone, introducing said gaseous mixture into said adsorption zone, adsorbing the more readily adsorbable constituents of said mixture on said adsorbent to form a rich adsorbent, flowing said rich adsorbent from said adsorption zone into a rectification zone, introducing into said rectification zone a reflux comprising a rich gas containing the more readily adsorbable constituents of said mixture, withdrawing said rich adsorbent from said rectification zone, suspending the withdrawn adsorbent in a rich lift gas and conveying as a gaseous suspension thereby said rich adsorbent from said rectification zone to a desorption zone, indirectly heating said rich adsorbent while countercurrently contacting the same with a stripping gas and desorbing the adsorbed constituents therefrom forming a lean adsorbent, withdrawing the desorbed constituents as a rich gas, introducing a portion thereof as reflux into said rectification zone, employing another portion thereof as said rich lift gas, flowing said lean adsorbent from said desorption zone into a cooling zone, cooling said lean adsorbent therein while passing therethrough a portion of a lean gas thereby removing from said lean adsorbent traces of moisture, withdrawing the cooled lean adsorbent from said cooling zone, withdrawing from said adsorption zone said lean gas comprising the less readily adsorbable constituents, introducing a portion thereof into said cooling zone, employing another portion thereof as a lean lift gas, suspending said cooled lean adsorbent in said lean lift gas and conveying as a gaseous suspension thereby said cooled lean adsorbent from said cooling zone to said adsorption zone.

5. A continuous process according to claim 4 wherein said granular solid adsorbent comprises charcoal.

6. A continuous process for separating a gaseous mixture containing constituents of varying degrees of adsorbability into substantially pure fractions thereof which comprises flowing a granular solid adsorbent downwardly by gravity through an adsorption zone, introducing said gaseous mixture into said adsorption zone, adsorbing the more readily adsorbable constituents of said gaseous mixture on said adsorbent to form a rich adsorbent and a lean gas consisting of the less readily adsorbable constituents of said mixture, flowing said rich adsorbent from said adsorption zone to a primary rectification zone, introducing therein a side cut gas reflux consisting of those constituents of said gaseous mixture of intermediate adsorbability, withdrawing said rich adsorbent from said primary rectification zone, suspending said rich adsorbent in a side cut lift gas and conveying as a gaseous suspension thereby said rich adsorbent from said primary rectification zone to a secondary rectification zone, introducing a rich gas reflux into said secondary rectification zone, desorbing thereby constituents of intermediate adsorbability as said side cut gas from said rich adsorbent, introducing a portion thereof into said primary rectification zone as said side cut gas reflux, employing another portion thereof as said side cut lift gas, flowing said rich adsorbent from said secondary rectification zone to a desorption zone, desorbing from said rich adsorbent the adsorbed constituents while contacting said adsorbent with a stripping gas to form a lean adsorbent, withdrawing the desorbed constituents as a rich gas, employing a portion thereof as said rich gas reflux, withdrawing said lean gas from said adsorption zone, withdrawing said lean adsorbent from said desorption zone, suspending said withdrawn adsorbent in a portion of said lean gas and thereby conveying as a gaseous suspension said lean adsorbent from said desorption zone to a cooling zone, flowing said lean adsorbent downwardly by gravity through said cooling zone countercurrent to a portion of said lean gas, cooling said adsorbent therein, withdrawing therefrom the cooled lean adsorbent, and introducing said cooled lean adsorbent into said adsorption zone.

7. A continuous process for separating a gaseous mixture according to claim 6 wherein said stripping gas comprises steam.

8. A continuous process for separating a gaseous mixture containing constituents of varying degrees of adsorbability into a plurality of fractions which comprises flowing charcoal downwardly by gravity through an adsorption zone, introducing said gaseous mixture into said adsorption zone, adsorbing therein the more readily adsorbable constituents of said gaseous mixture on said charcoal to form a rich charcoal and a lean gas consisting of the less readily adsorbable constituents of said mixture, flowing said rich charcoal from said adsorption zone to a primary rectification zone, introducing therein a side cut gas reflux consisting of those constituents of said gaseous mixture of intermediate adsorbability, withdrawing said rich charcoal from said primary rectification zone, suspending said rich charcoal in a side cut lift gas and conveying as a gaseous suspension thereby said rich charcoal from said primary rectification zone to a secondary rectification zone, introducing a rich gas reflux into said secondary rectification zone, withdrawing from said secondary rectification zone a side cut gas, introducing a portion thereof into said primary rectification zone as said side cut gas reflux, employing another portion thereof as said side cut lift gas, flowing said rich charcoal from said secondary rectification zone, desorbing from said rich charcoal the adsorbed constituents while contacting said rich charcoal with steam to form a lean charcoal, withdrawing the desorbed constituents as a rich gas together with said steam, cooling said rich gas and steam thereby condensing said steam to form water, separating said water from the cooled rich gas, employing a portion of said rich gas as said rich gas reflux, withdrawing said lean gas from said adsorption zone, employing a portion of said lean gas as a lean lift gas, withdrawing said lean charcoal from said desorption zone, suspending the withdrawn lean charcoal in said lean lift gas and thereby conveying as a gaseous suspension said lean charcoal from said desorption zone to a cooling zone, flowing said lean charcoal downwardly by gravity through said cooling zone countercurrent to a portion of said lean gas, cooling said lean charcoal in said cooling zone, withdrawing therefrom the cooled lean charcoal and introducing said cooled lean charcoal into said adsorption zone.

9. A continuous process for separating a gaseous mixture according to claim 8 wherein the more readily adsorbable constituents of said gaseous mixture comprise the vapors of volatile organic liquids commonly used as solvents.

10. A continuous process for separating a gaseous mixture according to claim 8 wherein the more readily adsorbable constituents of said gaseous mixture comprises at least one gaseous acid anhydride selected from that class of gaseous acid anhydrides comprising $CO_2$, $SO_2$, $SO_3$ and $N_2O_4 \rightleftharpoons 2NO_2$.

11. A continuous process for separating a gaseous mixture according to claim 8 wherein the less readily adsorbable constituent of said gaseous mixture comprises hydrogen and the more readily adsorbable constituent comprises at least one hydrocarbon gas selected from that class of hydrocarbon gases consisting of $C_1$ to $C_5$ hydrocarbon.

12. A continuous process for the separation of methane from natural gas which comprises flowing a moving bed of charcoal downwardly by gravity through an adsorption zone, introducing said natural gas into said adsorption zone, adsorbing therein the more readily adsorbable constituents to form an enriched charcoal and a lean gas comprising substantially pure methane, flowing said enriched charcoal into a rectification zone, introducing into said rectification zone a reflux comprising a rich gas containing said more readily adsorbable constituents, withdrawing said enriched charcoal from said rectification zone, suspending the withdrawn charcoal in a rich lift gas and conveying as a gaseous suspension thereby said charcoal from said rectification zone to a desorption zone, heating said enriched charcoal therein while contacting it with a countercurrent flow of stripping gas, desorbing thereby the adsorbed constituents to form a lean charcoal, withdrawing the desorbed constituents together with said stripping gas, separating said desorbed constituents as a dry rich gas from said stripping gas, returning a portion of said dry rich gas as said reflux to said rectification zone, employing another portion thereof as said rich lift gas, flowing said lean charcoal from said desorption zone through a sealing zone to a cooling zone, cooling said lean charcoal therein while passing upwardly therethrough a portion of said lean gas, withdrawing the cooled charcoal therefrom, withdrawing said lean gas from said adsorption zone, suspending said cooled charcoal in a portion of said lean gas and thereby conveying as a gaseous suspension said cooled charcoal from said cooling zone to said adsorption zone.

13. A continuous process according to claim 12 wherein said granular solid adsorbent comprises charcoal.

14. An apparatus for the continuous separation of a gaseous mixture by selective adsorption on a moving bed of granular charcoal which comprises an adsorption tower containing an adsorption section together with a cooling section and a desorption tower containing a desorption section together with a rectification section, said adsorption section having a cross sectional area relatively larger than said desorption section, means for continuously introducing said charcoal from the bottom of said desorption tower to the top of said adsorption tower, means for continuously introducing said charcoal from the bottom of said adsorption tower to the top of said desorption tower, means for introducing said gaseous mixture into said adsorption section, means for removing from the upper portion of said adsorption section the less readily adsorbable constituents of said gaseous mixture as a lean gas, means for heating said charcoal in said desorption section, means for countercurrently contacting the heated adsorbent with a stripping gas to desorb gases therefrom, and means for removing desorbed constituents as a rich gas from said desorption section.

15. An apparatus for the continuous separation of a gaseous mixture by selective adsorption on a moving bed of granular charcoal which comprises an adsorption tower containing an adsorption section together with at least one rectification section and a desorption tower containing a desorption section together with a cooling section, means for introducing said gaseous mixture into the lower portion of said adsorption section, means for removing the less readily adsorbable constituents as a lean gas from the upper portion of said adsorption section, means for introducing as reflux into said rectification section a dry rich gas containing the more readily adsorbable constituents of said gaseous mixture, means for withdrawing said charcoal from the bottom of said adsorption tower and continuously conveying it to the top of said desorption tower, means in said desorption section of said desorption tower for subjecting said charcoal to indirect heating in the presence of a stripping gas thereby desorbing the adsorbed constituents from the charcoal, means for removing the desorbed constituents, means for recovering said desorbed constituents as a dry rich gas, means for recirculating a portion of said dry rich gas to said rectification section as reflux, means for subjecting said charcoal to indirect cooling, means for withdrawing said charcoal from the bottom of said desorption tower and means for continuously conveying said charcoal to the top of said adsorption tower.

16. An apparatus according to claim 15 in which the adsorption tower contains two rectification sections, the upper being the primary rectification section and the lower being the secondary rectification section, the means for introducing rich gas reflux is in the lower portion of the secondary rectification section, and means are provided for removing a side cut gas from the upper portion of said secondary rectification section.

17. An apparatus for the continuous separation of a gaseous mixture which comprises an adsorption tower and a desorption tower, the two towers containing an adsorption section, at least one rectification section, a desorption section, a sealing leg section and a cooling section, means for introducing said gaseous mixture into the lower portion of said adsorption section, means for withdrawing from the upper portion of said adsorption section the less readily adsorbable constituents of said gaseous mixture as a lean gas, means for introducing as reflux a dry rich gas into said rectification section, outlet means for withdrawing said charcoal from the bottom of said adsorption tower, separating means positioned above said desorption tower for separating suspended charcoal from gases, connecting means connecting said outlet means and said separating means, means for introducing into said connecting means a portion of a dry rich gas, means for flowing said charcoal from said separating means into the top of said desorption tower, means in said desorption section for heating said charcoal in the presence of steam, means for removing near the upper portion of said desorption section the desorbed constituents, means for recovering said desorbed constituents as a dry rich gas, means for returning a portion thereof as reflux to said rectification section, outlet means for removing a mixture of said steam and said lean gas from said sealing leg section, means for recovering said lean gas therein as a dry lean gas, means for cooling said charcoal, outlet means for withdrawing said charcoal from said desorption tower, separating means positioned above said adsorption tower for separating suspended charcoal from gases, connecting means connecting said last-named outlet means and said last-named separating means, means for introducing a portion of said dry lean gas into said last-named connecting means, and means for flowing said charcoal from said last-named separating means to the top of said adsorption tower.

18. An apparatus according to claim 17 wherein said adsorption and rectification sections are positioned in said adsorption tower and said desorption and cooling sections are positioned in said desorption tower.

19. An apparatus for the continuous separation of a gaseous mixture by selective adsorption on a moving bed of granular charcoal which comprises an adsorption tower containing an absorption section together with a cooling section thereabove and a primary rectification section therebelow and a desorption tower containing a desorption section, said adsorption tower having a cross sectional area relatively larger than said desorption tower, means for continuously lifting said charcoal from the bottom of said desorption tower to the top of said adsorption tower, means for continuously lifting said charcoal from the bottom of said adsorption tower to the top of said desorption tower, means for introducing said gaseous mixture into said adsorption section, means for removing from the upper portion of said adsorption section the less readily adsorbable constituents of said gaseous mixture as a lean gas, means for heating said charcoal in said desorption section, means for countercurrently contacting the heated adsorbent with a stripping gas to desorb gases therefrom, and means for removing desorbed constituents as a rich gas from said desorption section.

20. An apparatus for the separation of methane from natural gas by selective adsorption on a moving bed of granular charcoal which comprises an adsorption tower containing an adsorption section together with a cooling section thereabove and a rectification section therebelow, and a desorption tower containing a desorption section, means for withdrawing adsorbent from the bottom of said adsorption tower, means for conveying the withdrawn adsorbent to the top of the desorption tower by means of a rich lift gas withdrawn from the top of said desorption tower, means for withdrawing adsorbent from the bottom of said desorption tower through a sealing leg, means for conveying the so withdrawn adsorbent to the top of the adsorption tower by means of a lean lift gas withdrawn from the top of the adsorption tower, means for introducing natural gas into the lower portion of said adsorption zone, means for removing lean gas from the upper portion of said adsorption zone, means for introducing steam into the lower portion of said desorption zone, means for removing rich gas from the upper portion of said desorption zone, and means for returning a portion of said rich gas to the lower portion of said rectification zone.

21. A process for the continuous separation of a gaseous mixture by selective adsorption on a solid adsorbent which comprises permitting a moving bed of granular adsorbent to flow downward by gravity through a cooling zone and an adsorption zone, conveying the adsorbent removed from below the adsorption zone to above a primary rectification zone, permitting the adsorbent to flow downward by gravity in a moving bed through a rectification zone and a desorption zone, conveying the adsorbent from below the desorption zone to above the cooling zone for recirculation therethrough, introducing said gaseous mixture into the lower portion of said adsorption zone, removing unadsorbed lean gas from the upper portion of said adsorption zone, desorbing adsorbed constituents of the gaseous mixture in said desorption zone by heating the adsorbent therein in the presence of a countercurrent stream of stripping gas, removing desorbed gases from the upper portion of said desorption zone as a rich gas, and returning a portion thereof as reflux to the lower portion of said rectification zone.

22. A continuous process according to claim 21 wherein said granular solid adsorbent comprises charcoal.

23. An apparatus for the separation of gaseous mixtures by selective adsorption on a solid adsorbent which comprises a stripping column and a separate adsorption column, the latter column having a cooling section near the top thereof, an adsorption section below said cooling section, and a rectification section below said adsorption section, passages between said sections permitting said adsorbent to flow continuously downwardly through said cooling, adsorption, and rectification sections, means for removing said adsorbent from the bottom of said adsorption column and conveying said adsorbent to the top of said stripping column, means for removing said adsorbent from the bottom of said stripping column and conveying it to the top of said adsorption column, means for introducing said gaseous mixture into the lower portion of said adsorption section, means for removing lean gas from the upper portion of the adsorption section, means for indirectly heating said adsorbent in said stripping column, means for introducing a stripping gas into lower portion of said stripping column, means for removing stripping gas and rich gas from the upper portion of said stripping column, means for separating said stripping gas from said rich gas, means for returning a portion of said separated rich gas to the lower portion of said rectification section, means for removing a side-cut gas from the upper portion of said rectification section, and means for indirectly cooling said adsorbent in said cooling section.

CLYDE H. O. BERG.
DONALD H. IMHOFF.

REFERENCES CITED

The following references are of record in the file of this patent:

UNITED STATES PATENTS

| Number | Name | Date |
|---|---|---|
| 1,422,007 | Soddy | July 4, 1922 |
| 1,522,480 | Allen | Jan. 13, 1925 |
| 1,702,311 | Pantenburg | Feb. 19, 1929 |
| 1,784,536 | Pantenburg | Dec. 9, 1930 |
| 1,825,707 | Wagner, Jr. | Oct. 6, 1931 |
| 1,836,301 | Bechthold | Dec. 15, 1931 |
| 2,070,099 | Twomey | Feb. 9, 1937 |
| 2,384,311 | Kearby | Sept. 4, 1945 |
| 2,397,566 | Schutte | Apr. 2, 1946 |

OTHER REFERENCES

"Charcoal as an Adsorbent," J. B. Garner; Natural Gas, November 1924.